United States Patent
Takata et al.

(10) Patent No.: US 9,941,524 B2
(45) Date of Patent: Apr. 10, 2018

(54) INTERCONNECTOR MATERIAL, INTERCELLULAR SEPARATION STRUCTURE, AND SOLID ELECTROLYTE FUEL CELL

(71) Applicant: MURATA MANUFACTURING CO., LTD., Nagaokakyo-Shi (JP)

(72) Inventors: Kazuhide Takata, Nagaokakyo (JP); Michiaki Iha, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 869 days.

(21) Appl. No.: 14/456,658

(22) Filed: Aug. 11, 2014

(65) Prior Publication Data

US 2015/0030958 A1    Jan. 29, 2015

Related U.S. Application Data

(63) Continuation of application No. 13/005,649, filed on Jan. 13, 2011, now Pat. No. 8,841,043, which is a
(Continued)

(30) Foreign Application Priority Data

| Jul. 14, 2008 | (JP) | 2008-182786 |
| Aug. 26, 2008 | (JP) | 2008-216383 |
| Apr. 24, 2009 | (JP) | 2009-106157 |

(51) Int. Cl.
*H01M 8/0236* (2016.01)
*C04B 35/26* (2006.01)
(Continued)

(52) U.S. Cl.
CPC ....... *H01M 8/0236* (2013.01); *C04B 35/2675* (2013.01); *C04B 35/47* (2013.01);
(Continued)

(58) Field of Classification Search
None
See application file for complete search history.

(56) References Cited

U.S. PATENT DOCUMENTS

| 5,403,461 A | 4/1995 | Tuller et al. |
| 5,827,620 A | 10/1998 | Kendall |
| 2008/0090127 A1 | 4/2008 | Gorte et al. |

FOREIGN PATENT DOCUMENTS

| JP | 04119924 A | 4/1992 |
| JP | 10134828 A | 5/1998 |

(Continued)

OTHER PUBLICATIONS

Machine translation of JP2008-091290A printed Jun. 24, 2017.*
(Continued)

*Primary Examiner* — Maria Laios
(74) *Attorney, Agent, or Firm* — Arent Fox LLP

(57) ABSTRACT

Provided is an interconnector material which is chemically stable in both oxidation atmospheres and reduction atmospheres, has a high electron conductivity (electric conductivity), a low ionic conductivity, does not contain Cr, and enables a reduction in sintering temperature. The interconnector material is arranged between a plurality of cells each composed of an anode layer, a solid electrolyte layer, and a cathode layer stacked sequentially, and electrically connects the plurality of cells to each other in series in a solid electrolyte fuel cell. The interconnector is formed of a ceramic composition represented by the composition formula $La(Fe_{1-x}Al_x)O_3$ in which $0<x<0.5$.

11 Claims, 8 Drawing Sheets

Related U.S. Application Data continuation of application No. PCT/JP2009/002566, filed on Jun. 8, 2009.

(51) Int. Cl.

| | | |
|---|---|---|
| *C04B 35/47* | (2006.01) | |
| *C04B 37/00* | (2006.01) | |
| *C04B 38/00* | (2006.01) | |
| *H01M 4/86* | (2006.01) | |
| *H01M 8/0217* | (2016.01) | |
| *H01M 8/2425* | (2016.01) | |
| *H01M 8/2465* | (2016.01) | |
| *H01M 4/90* | (2006.01) | |
| *H01M 8/12* | (2016.01) | |
| *H01M 8/24* | (2016.01) | |
| *C04B 111/00* | (2006.01) | |
| *H01M 8/124* | (2016.01) | |

(52) U.S. Cl.
CPC ........ *C04B 37/006* (2013.01); *C04B 38/0003* (2013.01); *H01M 4/8621* (2013.01); *H01M 4/9041* (2013.01); *H01M 8/0217* (2013.01); *H01M 8/12* (2013.01); *H01M 8/24* (2013.01); *H01M 8/2425* (2013.01); *H01M 8/2465* (2013.01); *C04B 2111/00853* (2013.01); *C04B 2235/3213* (2013.01); *C04B 2235/3217* (2013.01); *C04B 2235/3225* (2013.01); *C04B 2235/3227* (2013.01); *C04B 2235/3232* (2013.01); *C04B 2235/3251* (2013.01); *C04B 2235/3272* (2013.01); *C04B 2237/123* (2013.01); *C04B 2237/34* (2013.01); *C04B 2237/346* (2013.01); *C04B 2237/62* (2013.01); *H01M 2008/1293* (2013.01); *Y02E 60/50* (2013.01); *Y02E 60/525* (2013.01)

(56) References Cited

FOREIGN PATENT DOCUMENTS

| | | | |
|---|---|---|---|
| JP | 11040181 A | 2/1999 | |
| JP | 2001052725 A | 2/2001 | |
| JP | 2006185697 A | 7/2006 | |
| JP | 2007317611 A | 12/2007 | |
| JP | 2008-091290 A * | 4/2008 | .......... Y02E 60/525 |
| JP | 2008091290 A | 4/2008 | |
| WO | WO-94/20997 A1 | 9/1994 | |

OTHER PUBLICATIONS

International Search Report, dated Sep. 29, 2009.
Kuscer, Danjela et al.; "Some characteristics of $Al_2O_3$- and CaO-modified $LaFeO_3$-based cathode materials for solid oxide fuel cells"; Journal of Power Sources,vol. 61 (1996), pp. 161-165.
Supplementary European Search Report issued for EP Appl No. 09 79 7651, dated Jun. 25, 2013.

* cited by examiner

INTERCONNECTOR MATERIAL, INTERCELLULAR SEPARATION STRUCTURE, AND SOLID ELECTROLYTE FUEL CELL

This is a division of application Ser. No. 13/005,649, filed Jan. 13, 2011, which was continuation of application Serial No. PCT/JP 2009/002566, filed Jun. 8, 2009, the entire contents of which are incorporated herein by reference.

TECHNICAL FIELD

The present invention relates to an interconnector material, an intercellular separation structure formed by using the interconnector material, and a solid electrolyte fuel cell including the intercellular separation structure.

BACKGROUND ART

Generally, a planar solid electrolyte fuel cell (also referred to as a solid oxide fuel cell (SOFC)) is composed of a plurality of planar cells, as a power generating element, each composed of an anode (a negative electrode, a fuel electrode), a solid electrolyte and a cathode (a positive electrode, an air electrode) and interconnectors (also referred to as separators). The interconnectors are arranged between the plurality of cells in order to electrically connect the plurality of cells to each other in series and separate gases supplied to each of the plurality of cells; specifically, separate a fuel gas (e.g., hydrogen) as an anode gas supplied to an anode from an oxidant gas (e.g., air) as a cathode gas supplied to a cathode.

The interconnector needs to be chemically stable in a high-temperature environment of 800 to 1000° C. which is an operating temperature of the solid electrolyte fuel cell and in both oxidation and reduction atmospheres. Further, the interconnector material is desirably a material which has a high electric conductivity and can reduce an ohmic loss (IR loss).

In response to such requirements, the interconnector is conventionally formed of heat resistant metal materials or conductive ceramic materials such as lanthanum chromite ($LaCrO_3$). When the interconnector is formed by use of such a conductive material, it is possible to make a member fulfilling the above-mentioned functions of electrical connection and separation of gases from one material. Generally, there have been used dense bodies of ceramic such as lanthanum chromite having a perovskite structure doped with Sr, Ca or Mg as interconnector materials.

However, when sintering lanthanum chromite in the air in the methods conventionally adopted in order to form an interconnector by using lanthanum chromite, chromium oxide is evaporated from the lanthanum chromite powder or compounds containing volatile hexavalent chromium are sintered in the process of vaporization/recondensation. Therefore, densification resulting from diffusion within a particle is inhibited and a gas-tight sintered body cannot be obtained.

In order to solve such problems, for example, a compound containing, as a dominant component, a composition represented by the composition formula $La_{1-x}Ca_xCr_{1-y}O_3$ (values of x and y satisfy $0<x\le0.4$, $0<y\le0.05$, and $y\le x$) is proposed as a raw material powder of lanthanum chromite for forming a separator in Japanese Unexamined Patent Publication No. 4-119924 (hereinafter, referred to as Patent Document 1). Patent Document 1 indicates that in this raw material powder of lanthanum chromite, the amount of chromium evaporation can be reduced by making the chromium content insufficient and thereby the sintering property can be improved, and it becomes possible to realize a separator having an excellent gas-tight property, and to achieve chemical stability in the oxidation/reduction atmospheres and high electron conductivity, which are required for a separator.

Further, a compound containing, as a dominant component, a composition represented by the composition formula $Sr_{1-x}La_xTiO_3$ (the value of x satisfies $0<x\le0.3$) is proposed, for example, in Japanese Unexamined Patent Publication No. 2001-52725 (hereinafter, referred to as Patent Document 2) as an interconnector material not containing Cr.

Moreover, a composition represented by the composition formula $(La_{1-x}Sr_x)(Fe_{1-y}Ti_y)O_3$ (values of x and y satisfy $0\le x\le0.1$ and $0<y<0.5$) is proposed, for example, in Japanese Unexamined Patent Publication No. 2006-185697 (hereinafter, referred to as Patent Document 3) as an interconnector material which has a high sintering property, can be sintered at 1400° C. or lower, and does not contain Cr.

PRIOR ART DOCUMENTS

Patent Documents

Patent Document 1: Japanese Unexamined Patent Publication No. 4-119924
Patent Document 2: Japanese Unexamined Patent Publication No. 2001-52725
Patent Document 3: Japanese Unexamined Patent Publication No. 2006-185697

DISCLOSURE OF THE INVENTION

Problems to be Solved by the Invention

Since lanthanum chromite has a high sintering temperature, it is difficult to co-sinter integrally with other materials for a fuel electrode, a solid electrolyte, and an air electrode when being used for forming an interconnector. Therefore, the production efficiency of a solid electrolyte fuel cell deteriorates and production costs increase. Particularly, since lanthanum chromite is highly reactive with lanthanum manganite ($(La, Sr)MnO_3$) which is a material used for the air electrode and counter diffusion occurs between Cr and Mn, there is a problem that a decomposition reaction is accelerated. Further, Sr-based lanthanum chromite needs to be sintered at a high temperature of 1600° C. or higher to be densified. At this level of temperature, high electrode characteristics cannot be achieved since pores existing in the air electrode and the fuel electrode disappear or ionic diffusion becomes remarkable in the materials for the air electrode or the fuel electrode.

Ca-based lanthanum chromite proposed in Patent Document 1 can be densified by sintering at a low temperature of about 1300° C., but the sintering is performed in a liquid phase and therefore ion diffusion occurs and reactivity of lanthanum chromite increases, so that co-sintering with other materials for a fuel electrode, a solid electrolyte, or an air electrode, cannot be effected.

Further, lanthanum chromite has an environmental problem since, for example, $SrCrO_4$ and $CaCrO_4$ are produced as compounds of hexavalent chromium when producing lanthanum chromite.

On the other hand, the $(Sr, La)TiO_3$-based ceramic compositions proposed in Patent Document 2 is not preferred as an interconnector material since its electric conductivity in air at 900° C. is as low as about 0.001 S/cm.

Further, (La, Sr)(Fe, Ti)$O_3$-based ceramic compositions proposed in Patent Document 3 are not preferred as an interconnector material since their resistivity at 1000° C. is high, that is, electric conductivity thereof is low.

Thus, it is an object of the present invention to provide an interconnector material which is chemically stable in both oxidation and reduction atmospheres, has a high electron conductivity (electric conductivity) and a low ionic conductivity, does not contain Cr, and enables a reduction in this sintering temperature; an intercellular separation structure formed by using the interconnector material; and a solid electrolyte fuel cell including the intercellular separation structure.

Means for Solving the Problems

The interconnector material according to the present invention can be arranged between a plurality of cells each composed of an anode layer, a solid electrolyte layer, and a cathode layer stacked sequentially, and electrically connect the plurality of cells to each other in series in a solid electrolyte fuel cell, wherein a dominant component of the material is a ceramic composition represented by the composition formula La(Fe$_{1-x}$Al$_x$)$O_3$ in which x represents a molar value satisfying 0<x<0.5.

Since the interconnector material of the present invention contains a ceramic composition having the above-mentioned limited composition as a dominant component, it is chemically stable in both oxidation and reduction atmospheres, has a very low ionic conductivity and a high electron conductivity (electric conductivity), and can be sintered at a temperature up to about 1300 to 1400° C.

In the interconnector material of the present invention, it is preferred that the dominant component of the material is a ceramic composition represented by the composition formula La(Fe$_{1-x}$Al$_x$)$O_3$ in which x represents a molar amount satisfying 0.1≤x≤0.3.

If the composition of the interconnector material is further limited as described above, a material which is chemically stable in reduction atmospheres at a temperature as high as 1000° C. can be obtained, and the electron conductivity (electric conductivity) can be further increased.

The intercellular separation structure according to the present invention can also be an intercellular separation structure which is arranged between a plurality of cells each composed of an anode layer, a solid electrolyte layer, and a cathode layer stacked sequentially in a solid electrolyte fuel cell, wherein the intercellular separation structure includes an electrical insulator to separate an anode gas and a cathode gas which are supplied to each of the plurality of cells and an electrical conductor which is formed in the electrical insulator and electrically connects the plurality of cells to each other, the electrical insulator and the electrical conductor being formed by co-sintering, and wherein the electrical conductor is preferably formed of the interconnector material having the above-mentioned characteristics.

By employing such a constitution, an intercellular separation structure, which is chemically stable in a high-temperature environment of 800 to 1000° C., an operating temperature of the solid electrolyte fuel cell, and in both oxidation and reduction atmospheres, can be obtained by co-sintering at a low temperature of about 1300 to 1400° C.

In addition, the electrical conductor in the intercellular separation structure of the present invention may be partially formed of the interconnector material having the above-mentioned characteristics. In this case, the part of the electrical conductor of the interconnector material may be formed on the anode layer side or the cathode layer side to contact with an anode gas or a cathode gas, or may be formed at an intermediate portion of the electrical conductor.

By employing such a constitution, the size of the dense portion, through which a gas does not pass and which is formed of the interconnector material having the above-mentioned characteristics, is reduced, and thereby thermal stress produced during fabricating (co-sintering) the intercellular separation structure or during operating a solid electrolyte fuel cell can be mitigated. Further, in the above-mentioned electrical conductor, a material having a smaller electrical resistance than that of the interconnector material having the above-mentioned characteristics can be selected and used as a material for an electron flow path.

The solid electrolyte fuel cell according to one aspect of the present invention includes a plurality of cells each composed of an anode layer, a solid electrolyte layer and a cathode layer stacked sequentially, and the intercellular separation structure having the above-mentioned characteristics arranged between the plurality of cells.

By employing such a constitution, it is possible to obtain a solid electrolyte fuel cell including an intercellular separation structure, which is chemically stable in a high-temperature environment of 800 to 1000° C., an operating temperature of the solid electrolyte fuel cell, and in both oxidation and reduction atmospheres, and it is possible to obtain a solid electrolyte fuel cell including an interconnector which is particularly good in joining properties with the air electrode since an insulating layer is not formed at a junction interface between the interconnector and the air electrode.

The solid electrolyte fuel cell according to another aspect of the present invention may include a plurality of cells each composed of an anode layer, a solid electrolyte layer and a cathode layer stacked sequentially, and an intercellular separation structure which is arranged between the plurality of cells and at least a conductive material layer formed of the interconnector material containing a ceramic composition represented by the composition formula La(Fe$_{1-x}$Al$_x$)$O_3$ in which x represents a molar amount ratio satisfying 0<x<0.5 as a dominant component.

By employing such a constitution, it is possible to obtain a solid electrolyte fuel cell including an intercellular separation structure including a conductive material layer which is chemically stable in both oxidation and reduction atmospheres, has a very low ionic conductivity and a high electron conductivity (electric conductivity), and can reduce the sintering temperature to about 1300 to 1400° C.

In the solid electrolyte fuel cell according to another aspect of the present invention, it is preferred that the anode layer contains nickel, an intermediate layer is formed between the conductive material layer and the anode layer, and the intermediate layer is composed of a titanium-based perovskite oxide containing at least one element selected from the group consisting of strontium, calcium and barium.

By employing such a constitution, it is possible to prevent Fe contained in the interconnector material from reacting with Ni contained in the anode layer to produce a high-resistive phase at a junction interface between the conductive material layer and the anode layer when forming, by co-sintering, the anode layer containing nickel (Ni) and the conductive material layer formed of the interconnector material containing a ceramic composition represented by the composition formula La(Fe$_{1-x}$Al$_x$)$O_3$ in which x is 0<x<0.5 as a dominant component. Thereby, it is possible to improve the electrical connection of the anode layer containing nickel to the conductive material layer in the intercellular separation structure.

Furthermore, according to another aspect of the present invention, it is possible to form the plurality of cells and the intercellular separation structure by co-sintering, by employing such a constitution.

Furthermore, according to still another aspect of the present invention, it is preferred that the intermediate layer has pores.

In this case, since there is no need to densify the intermediate layer, and production of a cell structure is easy.

In the solid electrolyte fuel cell according to another aspect of the present invention, it is preferred that the titanium-based perovskite oxide is a perovskite oxide represented by $A_{1-x}B_xTi_{1-y}C_yO_3$ in which A represents at least one selected from the group consisting of Sr, Ca and Ba, B represents a rare-earth element, C represents Nb or Ta, and x and y each represent mols, satisfying $0 \leq x \leq 0.5$ and $0 \leq y \leq 0.5$.

In this case, B is preferably La or Y. By substituting La or Y of the rare-earth elements for part of A, the electric conductivity of the intermediate layer can be increased.

Effects of the Invention

According to the present invention, it is possible to obtain an interconnector material which is chemically stable in both oxidation and reduction atmospheres, has a low ionic conductivity and a high electron conductivity (electric conductivity), and can be densified at a low temperature of about 1300 to 1400° C. Further, by using the interconnector material, it is possible to obtain an intercellular separation structure, which is chemically stable in the high-temperature operating environment of 800 to 1000° C. being an of the solid electrolyte fuel cell and in both oxidation and reduction atmospheres, and a solid electrolyte fuel cell including the intercellular separation structure.

BEST MODE FOR CARRYING OUT THE INVENTION

Figure 1:
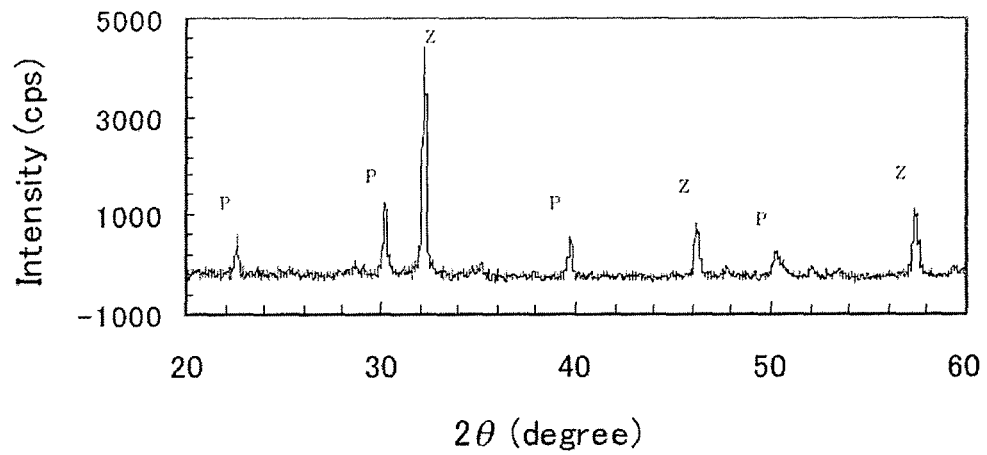
FIG. 1 is a graph showing one example of the peak intensity, obtained by XRD, of each phase of a bulk sample of an interconnector material of sample No. 3 (x=0.1) prepared in an example.

The present inventors made investigations from various standpoints in order to attain, an interconnector material for a solid electrolyte fuel cell which is arranged between a plurality of cells each composed of an anode layer, a solid electrolyte layer and a cathode layer stacked sequentially, and electrically connects the plurality of cells to each other in series in a solid electrolyte fuel cell, and which is chemically stable in both oxidation and reduction atmospheres, has a high electron conductivity (electric conductivity) and a low ionic conductivity, and has a composition not containing Cr, and which enables a reduction in sintering temperature.

Based on these investigations, the present inventor considered using a ceramic composition represented by the composition formula $La(Fe_{1-x}Al_x)O_3$ as the interconnector material for the solid electrolyte fuel cell.

Then, the present inventor prepared ceramic compositions represented by the composition formula $La(Fe_{1-x}Al_x)O_3$ at various composition ratios. Consequently, the present inventors found that when x satisfies $0<x<0.5$ in the ceramic composition represented by the composition formula $La(Fe_{1-x}Al_x)O_3$, in which x represents a molar amount, the interconnector material is chemically stable in both oxidation and reduction atmospheres, has a low ionic conductivity and a high electron conductivity (electric conductivity), and can reduce the sintering temperature to about 1300 to 1400° C.

Further, it was found that when x satisfies $0.1 \leq x \leq 0.3$ in the ceramic composition represented by the composition formula $La(Fe_{1-x}Al_x)O_3$, an interconnector material which is chemically stable even in high-temperature reduction atmospheres of 1000° C. can be attained and the electron conductivity (electric conductivity) of the material can also be made higher.

When the interconnector material contains a ceramic composition having the above-mentioned limited composition as a dominant component, it is possible to obtain an interconnector material which is chemically stable in both oxidation and reduction atmospheres, has a very low ionic conductivity and a high electron conductivity (electric conductivity), and can be densified at a low sintering temperature of about 1300 to 1400° C. Since the ionic conductivity is very low, loss resulting from a counter electromotive force generated in connecting the cells to each other can be neglected. Further, since the interconnector material of the present invention can be densified by sintering at a temperature of 1400° C. or lower, pores in the air electrode can be retained.

Moreover, the above-mentioned interconnector materials can be used for materials of the electrical conductor contained in an intercellular separation structure which is arranged between a plurality of cells each composed of an anode layer, a solid electrolyte layer, and a cathode layer stacked sequentially in the solid electrolyte fuel cell as an embodiment of the present invention. The intercellular separation structure can include an electrical insulator to separate an anode gas and a cathode gas which are supplied to each of the plurality of cells and an electrical conductor which is formed in the electrical insulator and electrically connects the plurality of cells to each other, and the electrical insulator and the electrical conductor can be formed by co-sintering. When the electrical conductor is formed of the interconnector material having the above-mentioned characteristics, an intercellular separation structure which is chemically stable in the high-temperature operating environment of 800 to 1000° C. temperature of the solid electrolyte fuel cell and in both oxidation and reduction atmospheres, can be obtained by co-sintering at a low temperature of about 1300 to 1400° C.

Moreover, the solid electrolyte fuel cell as an embodiment of the present invention includes a plurality of cells each composed of an anode layer, a solid electrolyte layer and a cathode layer stacked sequentially and an intercellular separation structure arranged between the plurality of cells, and the plurality of cells and the intercellular separation structure are formed by co-sintering. When the electrical conductor to constitute a part of the intercellular separation structure is formed of the interconnector material having the above-mentioned characteristics, it is possible to obtain a solid electrolyte fuel cell including an intercellular separation structure which is chemically stable in a high-temperature environment of 800 to 1000° C. and in both oxidation and reduction atmospheres. Particularly, since the interconnector is composed of a material whose dominant component is a perovskite phase, the solid electrolyte fuel cell can include the interconnector which is good in joining properties with the cathode layer composed of a material containing $La_{1-x}Sr_xMnO_3$ and the like, and further, the solid electrolyte fuel cell, in which an insulating layer is not formed at a junction interface between the interconnector and the cathode layer, can be obtained. As a result, there is no increase in electrical resistance due to the reaction between the interconnector and the air electrode. Since the interconnector is composed of a material not reacting with zirconia, the interconnector can be joined to each of the solid electrolyte layer, the cathode layer and the anode layer each containing zirconia without degrading the characteristics of these layers.

The solid electrolyte fuel cell as another embodiment of the present invention includes a plurality of cells each composed of an anode layer, a solid electrolyte layer and a cathode layer stacked sequentially, and an intercellular separation structure which is arranged between the plurality of cells and includes at least a conductive material layer formed of the interconnector material containing a ceramic composition represented by the composition formula $La(Fe_{1-x}Al_x)O_3$ in which x represents a molar amount satisfying $0<x<0.5$ as a dominant component.

By employing such a constitution, it is possible to obtain a solid electrolyte fuel cell including an intercellular separation structure having a conductive material layer which is chemically stable in both oxidation and reduction atmospheres, has a very low ionic conductivity and a high electron conductivity (electric conductivity), and can reduce the sintering temperature to about 1300 to 1400° C.

In the solid electrolyte fuel cell as another embodiment of the present invention, it is preferred that the anode layer contains nickel, an intermediate layer is formed between the conductive material layer and the anode layer, and the intermediate layer is composed of a titanium-based perovskite oxide containing at least one element selected from the group consisting of strontium, calcium and barium.

By employing such a constitution, it is possible to prevent Fe contained in the interconnector material from reacting with Ni contained in the anode layer to produce a high-resistive phase at a junction interface between the conductive material layer and the anode layer when forming, by co-sintering, the anode layer containing nickel (Ni) and the conductive material layer formed of the interconnector material containing a ceramic composition represented by the composition formula $La(Fe_{1-x}Al_x)O_3$ in which $0<x<0.5$ as a dominant component. Thereby, it is possible to improve the electrical connection of the anode layer containing nickel to the conductive material layer in the intercellular separation structure.

Further, in another embodiment of the present invention, by employing the above-mentioned constitution, it is possible to form the plurality of cells and the intercellular separation structure by co-sintering.

In the solid electrolyte fuel cell as another embodiment of the present invention, the intermediate layer preferably has pores. In this case, since there is no need to densify the intermediate layer, production of a cell structure is easy.

In another embodiment of the present invention, the titanium-based perovskite oxide is preferably a perovskite oxide represented by $A_{1-x}B_xTi_{1-y}C_yO_3$ in which A represents at least one selected from the group consisting of Sr, Ca and Ba, B represents a rare-earth element, C represents Nb or Ta, and x and y each represent a molar amount satisfying $0 \leq x \leq 0.5$ and $0 \leq y \leq 0.5$.

In this case, B is preferably La or Y. By substituting La or Y of the rare-earth elements for part of A, the electric conductivity of the intermediate layer can be increased.

Hereinafter, the constitutions of the solid electrolyte fuel cell as embodiments of the present invention will be described with reference to the drawings.

Figure 3:
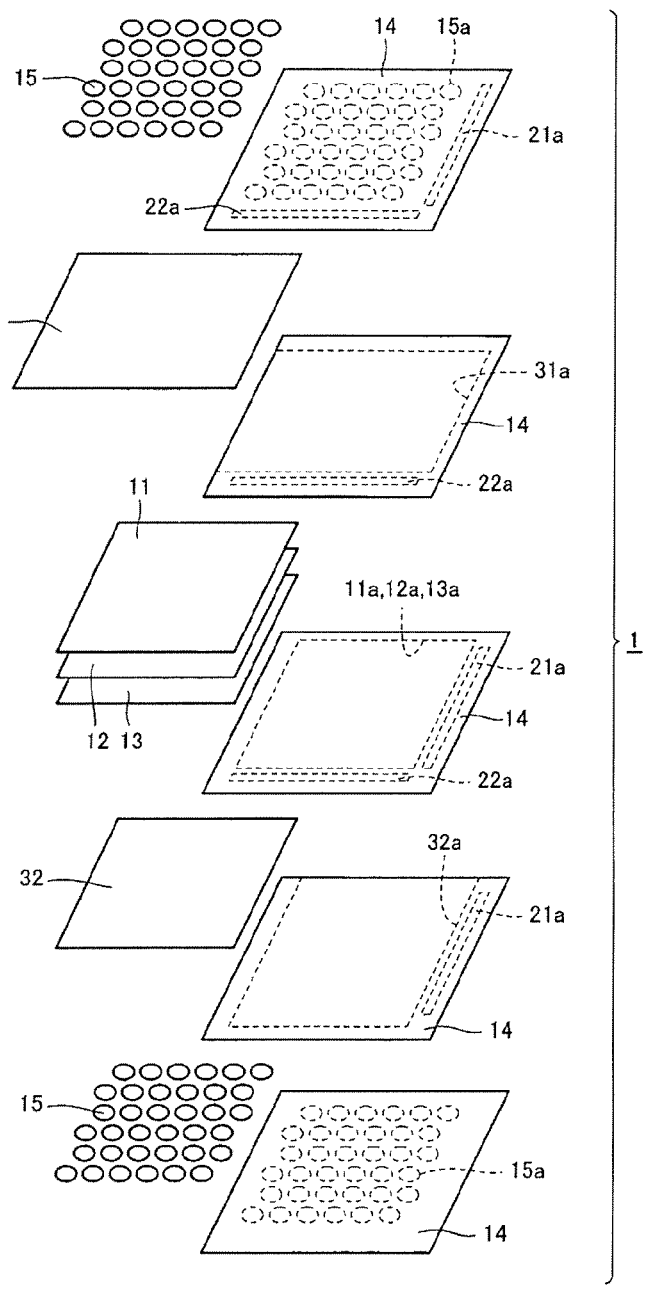
FIG. 3 is an exploded perspective view showing, in a disassembled state, members constituting a planar solid electrolyte fuel cell as an embodiment of the present invention.
Figure 4:
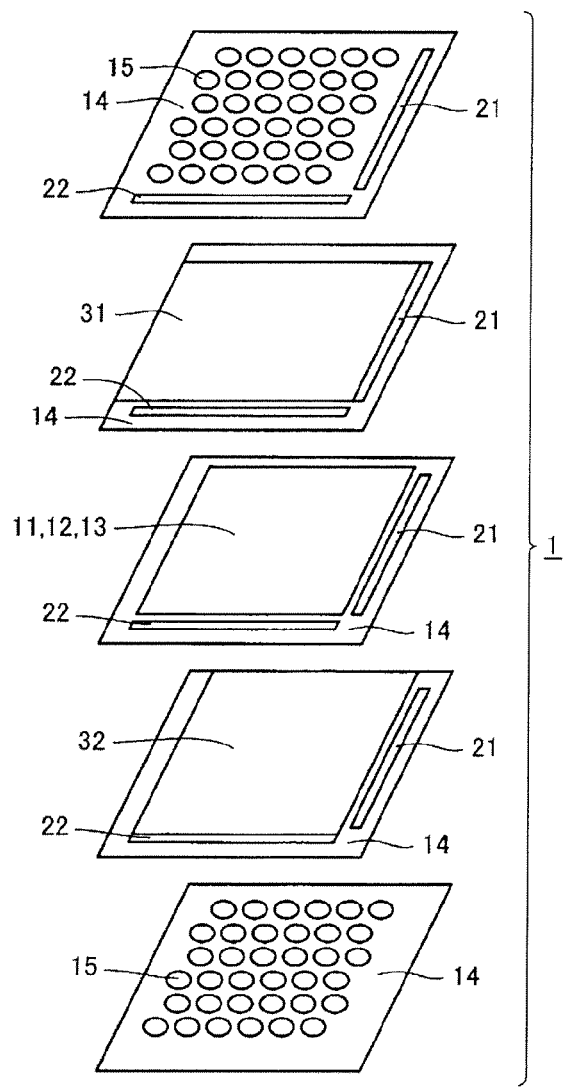
FIG. 4 is an exploded perspective view showing, in a disassembled state, a state in which sheets constituting a planar solid electrolyte fuel cell are stacked as an embodiment of the present invention.
Figure 5:
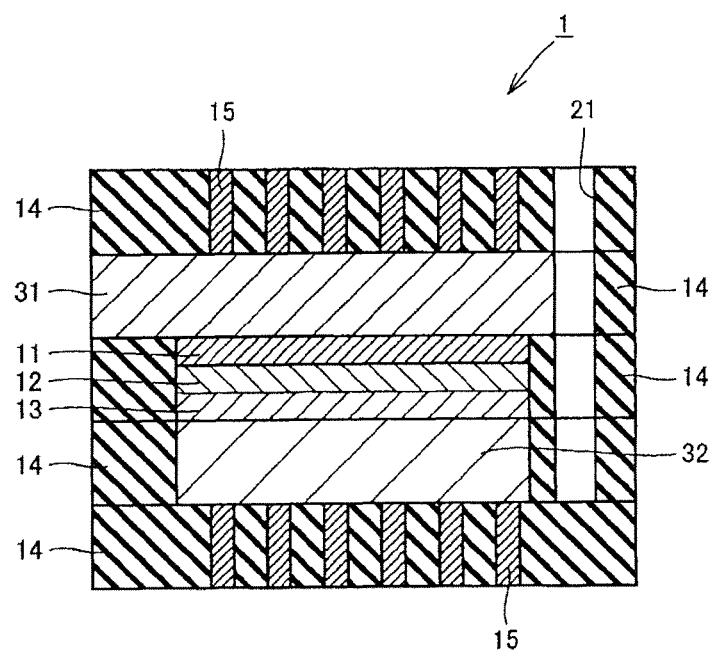
FIG. 5 is a sectional view schematically showing a cross-section of a planar solid electrolyte fuel cell as an embodiment of the present invention.

As shown in FIGS. 3 to 5, a solid electrolyte fuel cell 1 as an embodiment of the present invention includes a plurality of cells each composed of a fuel electrode layer 11 as an anode layer, a solid electrolyte layer 12 and an air electrode layer 13 as a cathode layer, and an intercellular separation structure arranged between the plurality of cells. The intercellular separation structure includes a support structure 14 composed of an electrical insulator to separate a fuel gas as an anode gas and air as a cathode gas which are supplied to each of the plurality of cells, and an interconnector 15 as an electrical conductor which is formed in the support structure 14 and electrically connects the plurality of cells to each other. The interconnector 15 is formed by using a ceramic composition represented by the composition formula $La(Fe_{1-x}Al_x)O_3$. The solid electrolyte fuel cell 1 shown in FIG. 5 is a battery including a single cell and the intercellular separation structures are disposed on both sides of the cell. Furthermore, a current collecting layer 31 of fuel electrode is disposed between the fuel electrode layer 11 and the interconnector 15, and a current collecting layer 32 of air electrode is disposed between the air electrode layer 13 and the interconnector 15.

The solid electrolyte fuel cell 1 as an embodiment of the present invention is fabricated in the following manner.

First, as shown by dashed lines in FIG. 3, through-holes 15a for filling green sheets of the plurality of interconnectors 15 are formed in the green sheet of the support structure 14 constituting the intercellular separation structure.

Further, as shown by dashed lines in FIG. 3, elongated through-holes 21a and 22a respectively for forming a fuel gas supply channel 21 and an air supply channel 22 shown in FIG. 4 are formed in the green sheet of the support structure 14 by puncturing the green sheet with a mechanical puncher.

Moreover, fitting portions 11a, 12a and 13a into which the green sheets of the fuel electrode layer 11, the solid electrolyte layer 12 and the air electrode layer 13 are to be fitted, respectively, are formed in the green sheet of the support structure 14 on which the fuel electrode layer 11, the solid electrolyte layer 12 and the air electrode layer 13 are to be arranged.

Moreover, fitting portions 31a and 32a into which the green sheets of the current collecting layer 31 of fuel electrode and the current collecting layer 32 of air electrode are to be fitted, respectively, are formed in the green sheet of the support structure 14 on which the current collecting layer 31 of fuel electrode and the current collecting layer 32 of air electrode are to be arranged. The green sheet of the current collecting layer 31 of fuel electrode is prepared by using a material having the same composition as that of the material powder of the fuel electrode layer 11 and the green sheet of the current collecting layer 32 of air electrode is prepared by using a material having the same composition as that of the material powder of the air electrode layer 13.

In the green sheets of the support structures 14 thus prepared, the green sheet of the interconnector 15 is fitted into the through-hole 15a, the green sheets of the fuel electrode layer 11, the solid electrolyte layer 12 and the air electrode layer 13 are fitted into the fitting portions 11a, 12a and 13a, respectively, and the green sheets of the current collecting layer 31 of fuel electrode and the current collecting layer 32 of air electrode are fitted into the fitting portions 31a and 32a, respectively. Five green sheets thus obtained are stacked sequentially as shown in FIG. 4.

The stacked layers are press-bonded to one another at a predetermined pressure by warm isostatic pressing (WIP) at a predetermined temperature for a predetermined time. The press-bonded body is degreased within a predetermined temperature range, and then is sintered by being maintained at a predetermined temperature for a predetermined time.

The solid electrolyte fuel cell 1 as an embodiment of the present invention is thus fabricated.

Figure 6:
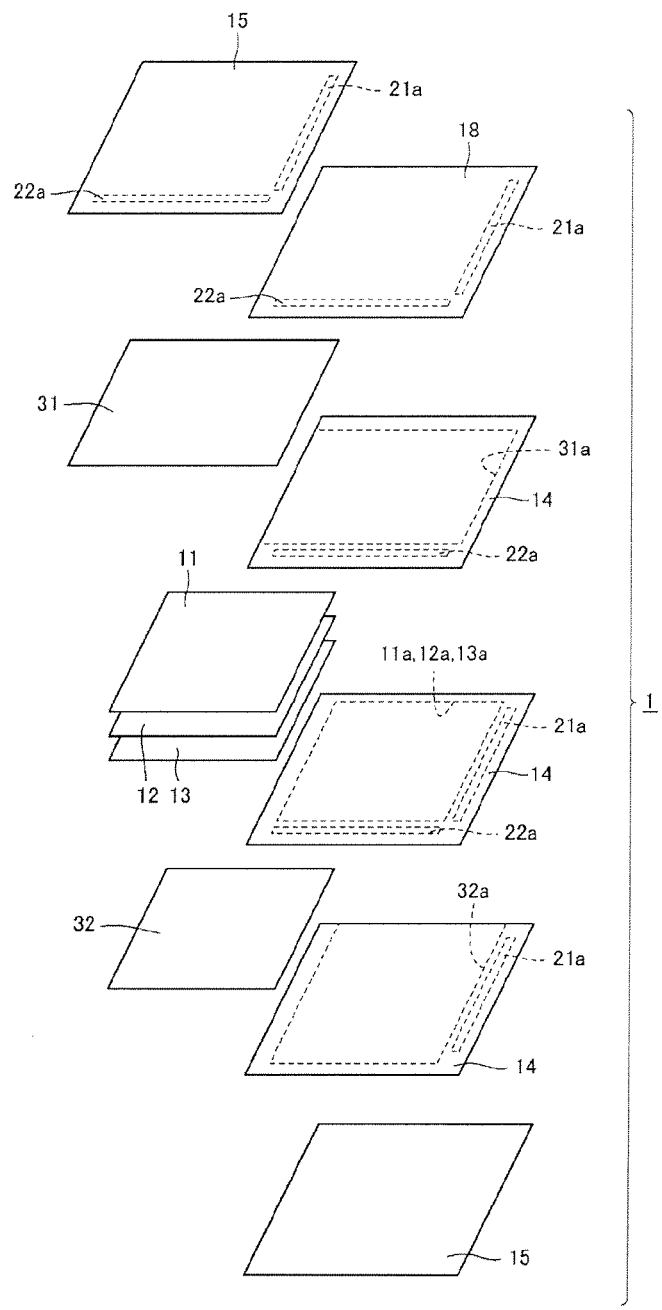
FIG. 6 is an exploded perspective view showing, in a disassembled state, members constituting a planar solid electrolyte fuel cell as another embodiment of the present invention and as a sample prepared in an example of the present invention.
Figure 7:
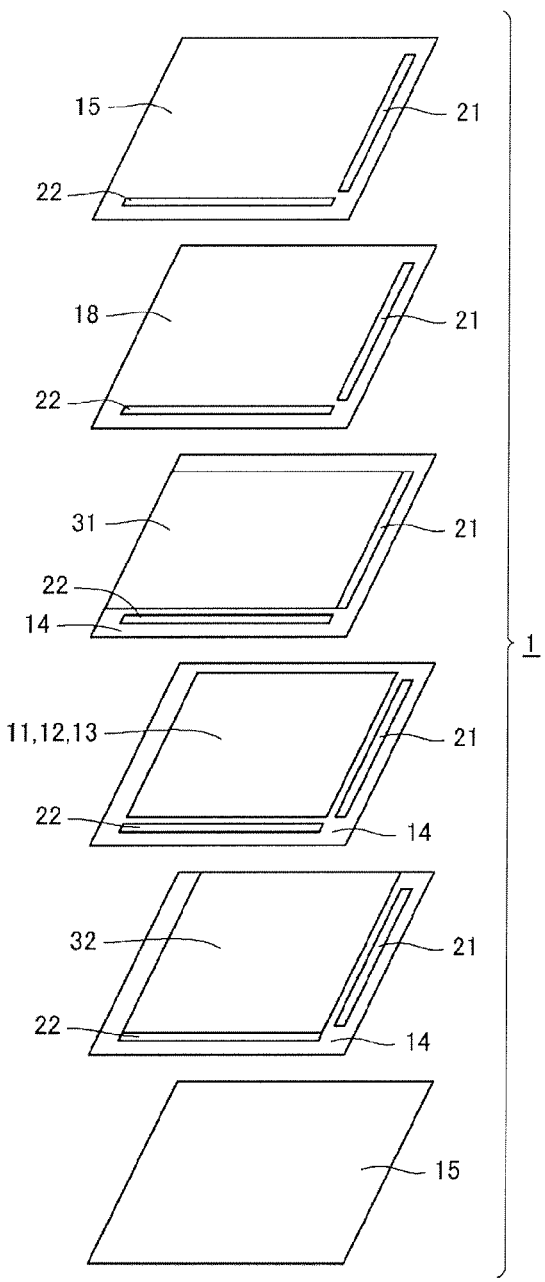
FIG. 7 is an exploded perspective view showing, in a disassembled state, a state in which sheets constituting a planar solid electrolyte fuel cell are stacked as another embodiment of the present invention and as a sample prepared in an example of the present invention.
Figure 8:
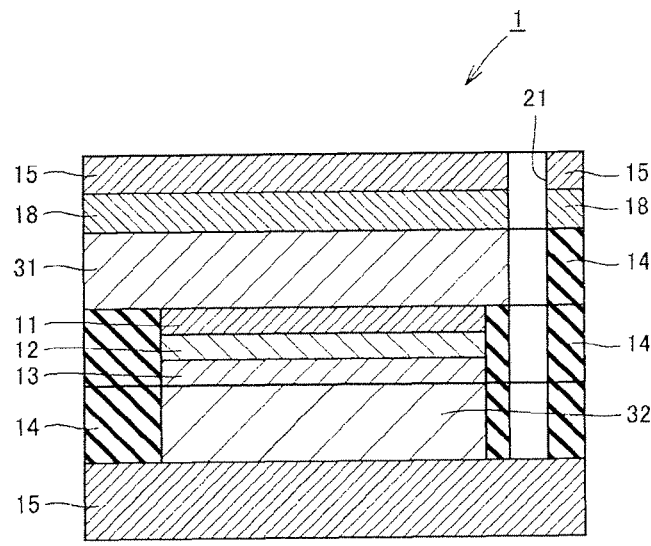
FIG. 8 is a sectional view schematically showing a cross-section of a planar solid electrolyte fuel cell as another embodiment of the present invention and as a sample prepared in an example of the present invention.

As shown in FIGS. 6 to 8, the solid electrolyte fuel cell 1 as another embodiment of the present invention includes a plurality of cells each composed of a fuel electrode layer 11 as an anode layer, a solid electrolyte layer 12 and an air electrode layer 13 as a cathode layer, and an intercellular separation structure arranged between the plurality of cells. Herein, the fuel electrode layer 11 contains nickel. A support structure 14, which is composed of an electrical insulator to separate a fuel gas as an anode gas and air as a cathode gas which are supplied to each of the plurality of cells, is formed outside the plurality of cells. The intercellular separation structure includes an interconnector 15 as an electrical conductor which electrically connects the plurality of cells to each other. The interconnector 15 is formed by using a ceramic composition represented by the composition formula $La(Fe_{1-x}Al_x)O_3$. The solid electrolyte fuel cell 1 shown in FIG. 8 is a battery including a single cell and intercellular separation structures are disposed on both sides of the cell. Furthermore, a current collecting layer 31 of fuel electrode is disposed between the fuel electrode layer 11 and the interconnector 15, and a current collecting layer 32 of air electrode is disposed between the air electrode layer 13 and the interconnector 15. The current collecting layer 31 of fuel electrode is prepared by using a material having the same composition as that of the material of the fuel electrode layer 11 and the current collecting layer 32 of air electrode is prepared by using a material having the same composition as that of the material of the air electrode layer 13. An intermediate layer 18 is disposed between the interconnector 15 and the fuel electrode layer 11, specifically, between the interconnector 15 and the current collecting layer 31 of fuel electrode. The intermediate layer 18 is formed by using a titanium-based perovskite oxide represented by $A_{1-x}B_xTi_{1-y}C_yO_3$ in which A represents at least one selected from the group consisting of Sr, Ca and Ba, B represents a rare-earth element, C represents Nb or Ta, $0 \leq x \leq 0.5$ and $0 \leq y \leq 0.5$, for example, $SrTiO_3$.

When thus subjecting the interconnector 15 composed of the ceramic composition represented by the composition formula $La(Fe_{1-x}Al_x)O_3$, and the fuel electrode layer 11/the current collecting layer 31 of fuel electrode, which contain nickel, to co-sintering, an intermediate layer 18, which is composed of a titanium-based perovskite oxide represented by $SrTiO_3$, for example, is disposed between the interconnector 15 and the fuel electrode layer 11/the current collecting layer 31 of fuel electrode for the purpose of preventing Fe contained in the interconnector 15 from reacting with Ni contained in the fuel electrode layer 11 and the current collecting layer 31 of fuel electrode. Herein, the interconnector 15 is formed densely so as to have a high electric conductivity, in other words, a small electrical resistance, and prevent the permeation of air or a fuel gas. The material composing the intermediate layer 18 does not have to be dense, and may be porous.

It is based on the following findings of the present inventors that the intermediate layer 18 composed of a titanium-based perovskite oxide is disposed in between the interconnector 15 composed of the ceramic composition represented by the composition formula $La(Fe_{1-x}Al_x)O_3$ and the fuel electrode layer 11/the current collecting layer 31 of fuel electrode, which contain nickel, as described above.

When the interconnector 15, which is composed of the ceramic composition represented by the composition formula $La(Fe_{1-x}Al_x)O_3$, was joined to the fuel electrode layer 11 containing nickel through co-sintering, Fe reacted with Ni to produce $LaAlO_3$ having a smaller Fe content at a junction portion (interface). $LaAlO_3$ has a low electric conductivity and interfered with electric joining between the interconnector 15 composed of the ceramic composition represented by the composition formula $La(Fe_{1-x}Al_x)O_3$ and the fuel electrode layer 11 containing nickel. Thus, the intermediate layer 18, which is composed of a titanium-based perovskite oxide in which an electric conductivity is increased in a fuel atmosphere, for example, $SrTiO_3$, was disposed, and consequently good electrical connection was attained. This is because $SrTiO_3$, for example, which is one of compounds represented by $A_{1-x}B_xTi_{1-y}C_yO_3$, in which A represents at least one selected from the group consisting of Sr, Ca and Ba, B represents a rare-earth element, C represents Nb or Ta, $0 \leq x \leq 0.5$ and $0 \leq y \leq 0.5$, composing the intermediate layer 18, does not form a high-resistive layer even if it is subjected to co-sintering together with the interconnector 15 composed of the ceramic composition represented by the composition formula $La(Fe_{1-x}Al_x)O_3$ and the fuel electrode layer 11 containing nickel.

The solid electrolyte fuel cell 1 as another embodiment of the present invention is fabricated in the following manner.

First, as shown by dashed lines in FIG. 6, elongated through-holes 21a and 22a respectively for forming a fuel gas supply channel 21 and an air supply channel 22 shown in FIG. 7 are formed in the green sheet of the support structure 14 by puncturing the green sheet with a mechanical puncher.

Further, fitting portions 11a, 12a and 13a into which the green sheets of the fuel electrode layer 11, the solid electrolyte layer 12 and the air electrode layer 13 are to be fitted, respectively, are formed in the green sheet of the support structure 14 on which the fuel electrode layer 11, the solid electrolyte layer 12 and the air electrode layer 13 are to be arranged.

Moreover, fitting portions 31a and 32a into which the green sheets of the current collecting layer 31 of fuel electrode and the current collecting layer 32 of air electrode are to be fitted, respectively, are formed in the green sheet of the support structure 14 on which the current collecting layer 31 of fuel electrode and the current collecting layer 32 of air electrode are to be arranged. The green sheet of the current collecting layer 31 of fuel electrode is prepared by using a material having the same composition as that of the material powder of the fuel electrode layer 11 and the green sheet of the current collecting layer 32 of air electrode is prepared by using a material having the same composition as that of the material powder of the air electrode layer 13.

Furthermore, as shown by dashed lines in FIG. 6, elongated through-holes 21a and 22a respectively for forming a fuel gas supply channel 21 and an air supply channel 22 shown in FIG. 7 are formed in the green sheets of the interconnector 15 and the intermediate layer 18 by puncturing the green sheets with a mechanical puncher.

In the green sheets of the support structures 14 thus prepared, the green sheets of the fuel electrode layer 11, the solid electrolyte layer 12 and the air electrode layer 13 are fitted into the fitting portions 11a, 12a and 13a, respectively, and the green sheets of the current collecting layer 31 of fuel electrode and the current collecting layer 32 of air electrode are fitted into the fitting portions 31a and 32a, respectively. The green sheets of the interconnector 15 and the intermediate layer 18 are stacked sequentially on three green sheets thus obtained as shown in FIG. 7.

The stacked layers are press-bonded to one another at a predetermined pressure by warm isostatic pressing (WIP) at a predetermined temperature for a predetermined time. The press-bonded body is degreased within a predetermined temperature range, and then is sintered by being maintained at a predetermined temperature for a predetermined time.

The solid electrolyte fuel cell 1 as another embodiment of the present invention is thus fabricated.

In the above-mentioned embodiment, the entire electrical conductor which electrically connects the plurality of cells to each other is composed of the interconnector 15 formed of the interconnector material of the present invention as shown in FIGS. 5 and 8, but only a part of the electrical conductor may be formed of the interconnector material of the present invention.

Figure 9:
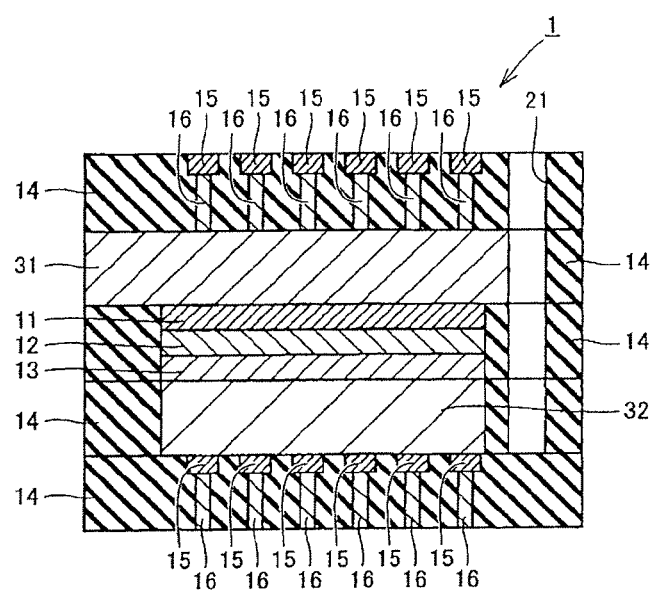
FIG. 9 is a sectional view schematically showing a cross-section of a planar solid electrolyte fuel cell as an example in which a part of the electrical conductor is formed of the interconnector material of the present invention.
Figure 10:
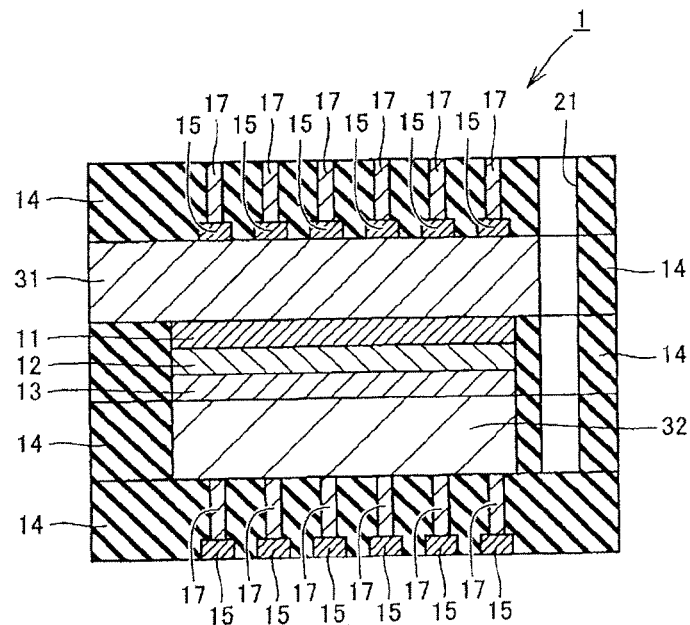
FIG. 10 is a sectional view schematically showing a cross-section of a planar solid electrolyte fuel cell as another example in which a part of the electrical conductor is formed of the interconnector material of the present invention.
Figure 11:
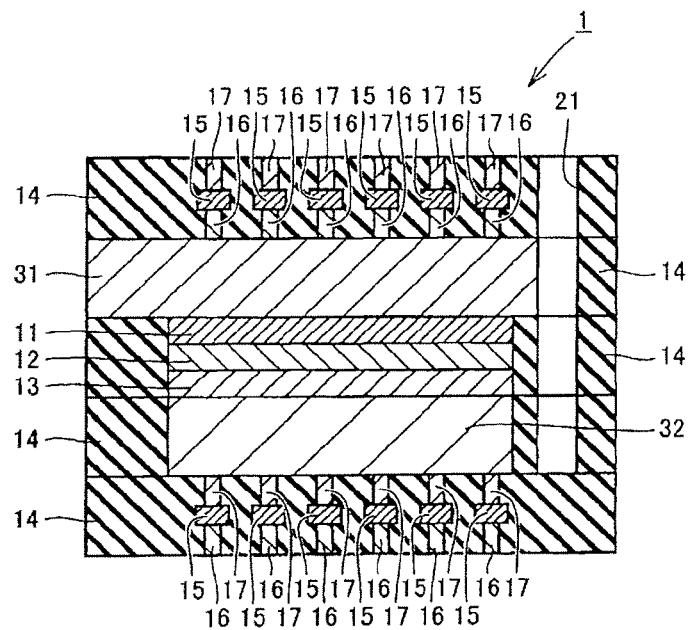
FIG. 11 is a sectional view schematically showing a cross-section of a planar solid electrolyte fuel cell as another example in which a part of the electrical conductor is formed of the interconnector material of the present invention.

FIGS. 9 to 11 are sectional views each schematically showing a cross-section of a planar solid electrolyte fuel cell as some examples in which a part of the electrical conductor is formed of the interconnector material of the present invention.

As shown in FIG. 9, the intercellular separation structure includes a support structure 14 composed of an electrical insulator to separate a fuel gas as an anode gas and air as a cathode gas which are supplied to each of the plurality of cells, an interconnector 15, which is composed of the interconnector material of the present invention, as an electrical conductor which is formed in the support structure 14 and electrically connects the plurality of cells to each other, and a conductive body 16 for an interconnector formed so as to connect to the interconnector 15. The interconnector 15 is formed on the air electrode layer 13 side so as to contact with air. More specifically, it is formed so as to connect to the air electrode layer 13 through the current collecting layer 32 of air electrode. The conductive body 16 for an interconnector is formed so as to contact with a fuel gas. More specifically, it is formed so as to connect to the fuel electrode layer 11 through the current collecting layer 31 of fuel electrode, and is made of, for example, a mixture of nickel oxide (NiO) and yttria-stabilized zirconia (YSZ).

Further, as shown in FIG. 10, the intercellular separation structure includes a support structure 14 composed of an electrical insulator to separate a fuel gas as an anode gas and air as a cathode gas which are supplied to each of the plurality of cells, an interconnector 15, which is composed of the interconnector material of the present invention, as an electrical conductor which is formed in the support structure 14 and electrically connects the plurality of cells to each other, and a conductive body 17 for an interconnector formed so as to connect to the interconnector 15. The interconnector 15 is formed on the fuel electrode layer 11 side so as to contact with a fuel gas. More specifically, it is formed so as to connect to the fuel electrode layer 11 through the current collecting layer 31 of fuel electrode. The conductive body 17 for an interconnector is formed so as to contact with air. More specifically, it is formed so as to connect to the air electrode layer 13 through the current collecting layer 32 of air electrode, and is made of, for example, a mixture of lanthanum manganite $((La, Sr)MnO_3)$ and yttria-stabilized zirconia (YSZ).

Furthermore, as shown in FIG. 11, an intercellular separation structure includes a support structure 14 composed of an electrical insulator to separate a fuel gas as an anode gas and air as a cathode gas which are supplied to each of the plurality of cells, an interconnector 15, which is composed of the interconnector material of the present invention, as an electrical conductor which is formed in the support structure 14 and electrically connects the plurality of cells to each other, and conductive bodies 16 and 17 for an interconnector formed so as to connect to the interconnector 15. The conductive body 16 for an interconnector is formed so as to contact with a fuel gas. More specifically, it is formed so as to connect to the fuel electrode layer 11 through the current collecting layer 31 of fuel electrode, and is made of, for example, a mixture of nickel oxide (NiO) and yttria-stabilized zirconia (YSZ). The conductive body 17 for an interconnector is formed so as to contact with air. More specifically, it is formed so as to connect to the air electrode layer 13 through the current collecting layer 32 of air electrode, and is made of, for example, a mixture of lanthanum manganite $((La, Sr)MnO_3)$ and yttria-stabilized zirconia (YSZ). The interconnector 15 is formed so as to connect the conductive bodies 16 and 17 for an interconnector to each other.

As shown in FIGS. 9 to 11, the interconnector 15 in the intercellular separation structure of the present invention, which is formed of the interconnector material of the present invention, may be formed on the fuel electrode layer 11 (as an anode layer) side or the air electrode layer 13 (as a cathode layer) side, as shown in FIG. 9 or 10, to contact with a fuel gas as an anode gas or air as a cathode gas, or may be formed at an intermediate portion of the electrical conductor, as shown in FIG. 11.

By employing such a constitution, the size of a dense portion through which a gas does not pass and which is formed of the interconnector material of the present invention is reduced, and thereby thermal stress produced during fabricating (co-sintering) the intercellular separation structure or during operating the solid electrolyte fuel cell can be mitigated. Further, a material having a smaller electrical resistance than that of the interconnector material of the present invention can be selected and used as a material composing an electron flow path in the above-mentioned electrical conductor.

For example, the green sheet of an intercellular separation structure shown in FIG. 9 is fabricated in the following manner. First, the green sheet for a support structure 14 is prepared. Through-holes are formed in the green sheet for the support structure 14, and a mixed paste of nickel oxide (NiO) and zirconia stabilized with 8 mol % of yttria (YSZ) is filled into the through-holes. This paste is prepared by mixing NiO, YSZ and a vehicle in proportions of 80 parts by weight:20 parts by weight:60 parts by weight and kneading the mixture with a three-roll kneader. As the vehicle, a mixture of ethyl cellulose and a solvent, trade name EC-200 FTR manufactured by Nisshin Kasei Co., Ltd., is used. In the meantime, a green sheet for the interconnector 15 is prepared. Then, the green sheet for the interconnector 15 is cut into the disc-shape shown in FIG. 3 so as to have a larger diameter than that of the through-hole, and the disc-shaped green sheet for the interconnector 15 is press-bonded to an air electrode side of a through-hole portion of a green sheet for the support structure 14. Further, in order to prepare the green sheet of the intercellular separation structure shown in FIG. 8, two green sheets for the support structure 14 are prepared and the disc-shaped green sheet for the interconnector 15 is press-bonded to the green sheets for the support structure 14 with the disc-shaped green sheet for the interconnector 15 interposed between the two green sheets for the support structure 14.

In the above-mentioned embodiment, an example in which the interconnector material of the present invention is applied to an interconnector of a planar solid electrolyte fuel cell and an intercellular separation structure including the interconnector has been described, but the interconnector material of the present invention can also be applied to an interconnector formed at a part on a cylindrical outer circumferential face in a cylindrical solid electrolyte fuel cell, an interconnector formed on a flat surface in a flat tube-shaped solid electrolyte fuel cell, and interconnectors having various shapes other than the above-mentioned shapes.

EXAMPLES

Hereinafter, examples of the present invention will be described.

First, bulk samples of ceramic compositions represented by the composition formula $La(Fe_{1-x}Al_x)O_3$ were prepared at various composition ratios as interconnector materials according to the following procedure, and each sample was evaluated.

(Preparation of Bulk Sample)

As starting materials of the samples of sample Nos. 1 to 9, lanthanum oxide ($La_2O_3$), iron oxide ($Fe_2O_3$), and aluminum oxide ($Al_2O_3$) were weighed stoichiometrically and mixed so that the values of x, which is a molar amount in the composition formula $La(Fe_{1-x}Al_x)O_3$, are values shown in Table 1. Water was added to the mixtures, and the resulting mixtures were milled with zirconia balls and mixed. Thereafter, the resulting mixed powders were dried and calcined at 1100° C. An organic solvent and a butyral-based binder were added to the obtained calcined powders, and the resulting mixtures were mixed to prepare slurries. The slurries were formed into sheets by a the doctor blade method. The resulting green sheets were subjected to binder removal treatment, and then were sintered by being maintained at 1300° C. and at 1400° C. to obtain samples. The following evaluations were performed with the obtained samples.

In Table 1, x in each of the composition formulas of the samples of sample Nos. 2 to 7 satisfies $0.05 \leq x \leq 0.4$ (within the scope of the present invention), and x in each of the composition formulas of the samples of sample Nos. 1, 8 and 9 is 0, 0.5, or 1 (out of the scope of the present invention). The samples of sample Nos. 2 to 8 were evaluated on the following properties (1) to (6) and the samples of sample Nos. 1 and 9 were evaluated on the following properties (1) to (5).

(Evaluation of Bulk Sample of Material for Interconnector)

(1) X-Ray Diffraction

The produced phase was identified by performing a powder X-ray diffraction analysis (XRD, CuKα rays) after calcination and after sintering of the sample. It was identified that all of the phases produced after sintering were a single phase of a perovskite structure.

(2) Sintering Property

Densities of the sintered samples were measured according to the Archimedes method. The sintering properties of the samples were evaluated depending on whether relative densities measured after sintering the samples at 1300° C. and at 1400° C. are 92% or more, or not. In Table 1, the case where the relative density measured after sintering the samples at 1300° C. or 1400° C. is 92% or more is represented by "good" in the box of "Sintering property (1300° C.)" or "Sintering property (1400° C.)", and the case where the relative density is less than 92% is represented by "poor".

(3) Electric Conductivity

With respect to the sintered samples, the electric conductivities in an oxidation atmosphere (900° C. in the atmospheric air) and in a reduction atmosphere (hydrogen gas containing about 4% of water vapor), and the electric conductivities in those atmospheres at 1000° C. were measured by an alternating current four probe analysis. The electric conductivity decreased as x increased. When power is generated at a current density of 0.3 A/cm² by a planar solid electrolyte fuel cell and the thickness of the sample is 40 μm, an electric conductivity of 0.025 Scm$^{-1}$ or more is required so as to achieve an ohmic loss of 50 mV or less. When the interconnector is interposed between insulative support structures in the fuel cell, an electric conductivity of 0.05 Scm$^{-1}$ or more, which is two times as large as the above-mentioned electric conductivity, is required if the proportion of the interconnector is 50% by volume or less. In consideration of the above, the sample in which the electric conductivity is 0.05 Scm$^{-1}$ or more is represented by "very good", the sample in which the electric conductivity is 0.025 Scm$^{-1}$ or more and less than 0.05 Scm$^{-1}$ is represented by "good", and the sample in which the electric conductivity is less than 0.025 Scm$^{-1}$ is represented by "poor" in Table 1.

(4) Reduction Stability

Powder X-ray diffraction analysis was used to determine whether the single phase of a perovskite structure is decomposed or not, by annealing the samples for 61 hours in reduction atmospheres of 900° C. and 1000° C. In the sample No. 1 (x=0), the single phase of a perovskite structure was decomposed into $La_2O_3$ (or $La(OH)_3$) and metal Fe. In the sample No. 2 (x=0.05), the single phase of a perovskite structure was stable in a reduction atmosphere of 900° C., but the single phase of a perovskite structure was decomposed in a reduction atmosphere of 1000° C. to produce $La_2O_3$ and metal Fe. In the sample Nos. 3 to 9 (x≤0.1), the single phases of a perovskite structure were stable in reduction atmospheres of 900° C. and 1000° C., and there was no production of $La_2O_3$ and metal Fe. The sample in which the decomposition of the single phase of a per- 4% of water vapor) of 30° C., which has an oxygen partial pressure equivalent to an oxygen partial pressure of a fuel gas, was blown to one surface of the sintered body being maintained at 900° C. and air was blown to the other surface of the sintered body to measure the electromotive force of the sintered body as a hydrogen concentration cell. While a voltage of up to 1.04 V (a theoretical value) is generated in the case where oxygen-ionic conduction occurs, electromotive forces of about 2 mV were generated in all of the evaluated samples. Consequently, it is estimated that 0.2% of all the electric conductivity corresponds to ionic conduction. This level of ionic conduction is very small compared with electron conduction and can be neglected. In Table 1, the fact that there is little ionic conductivity is represented by "good".

TABLE 1

| Sample No. | x | Reduction stability (900° C.) | Reduction stability (1000° C.) | Electric conductivity [$Scm^{-1}$] in oxidation atmospheres (900° C.) | Electric conductivity [$Scm^{-1}$] in reduction atmospheres (900° C.) | Electric conductivity [$Scm^{-1}$] in oxidation atmospheres (1000° C.) | Electric conductivity [$Scm^{-1}$] in reduction atmospheres (1000° C.) | Sintering property (1300° C.) | Sintering property (1400° C.) | Reaction with zirconia | Ionic conductivity |
|---|---|---|---|---|---|---|---|---|---|---|---|
| 1 | 0 | poor | poor | 0.50 (very good) | — | 0.58 (very good) | — | good | good | good | good |
| 2 | 0.05 | good | poor | 0.40 (very good) | 0.70 (very good) | 0.45 (very good) | — | good | good | good | good |
| 3 | 0.1 | good | good | 0.29 (very good) | 0.44 (very good) | 0.33 (very good) | 0.90 (very good) | good | good | good | good |
| 4 | 0.15 | good | good | 0.22 (very good) | 0.37 (very good) | 0.25 (very good) | 0.71 (very good) | good | good | good | good |
| 5 | 0.2 | good | good | 0.16 (very good) | 0.29 (very good) | 0.18 (very good) | 0.51 (very good) | good | good | good | good |
| 6 | 0.3 | good | good | 0.06 (very good) | 0.12 (very good) | 0.07 (very good) | 0.24 (very good) | poor | good | good | good |
| 7 | 0.4 | good | good | 0.02 (poor) | 0.06 (very good) | 0.05 (very good) | 0.10 (very good) | poor | good | good | good |
| 8 | 0.5 | good | good | 0.01 (poor) | 0.02 (poor) | 0.02 (poor) | 0.03 (good) | poor | poor | good | good |
| 9 | 1 | good | good | 0.0001 (poor) | 0.0001 (poor) | 0.0001 (poor) | 0.0001 (poor) | poor | poor | good | good | ovskite structure did not take place in the reduction atmosphere of 900° C. or 1000° C. was denoted by "good", and the sample in which the decomposition of the single phase of a perovskite structure took place in the reduction atmosphere of 900° C. or 1000° C. was denoted by "poor" and the results are shown in Table 1.

(5) Reactivity with Zirconia

Zirconia ($ZrO_2$) stabilized with $Y_2O_3$ added in an amount of 3 mol % (yttria-stabilized zirconia: YSZ) and raw materials of the samples were mixed, and then the resulting mixtures were sintered at 1300° C. The produced phase was identified by performing a powder X-ray diffraction analysis (XRD, CuKα rays). In all of the samples, a reaction with zirconia did not occur. In Table 1, "good" shows that the reaction with zirconia did not occur. FIG. 1 shows one example of the peak intensity of each phase of sample No. 3 (x=0.1), obtained by XRD. In FIG. 1, P indicates a peak of a perovskite phase and Z indicates a peak of a zirconia phase.

(6) Ionic Conductivity

Green sheets of the samples of sample Nos. 2 to 8, each having a composition in which x satisfies 0.05≤x≤0.5, were processed into a disc-shape having a diameter of 30 mm and a thickness of 10 mm. After these green sheets were sintered, platinum electrodes were formed on both sides of the sintered body. A humidified hydrogen gas (containing about As shown in Table 1, sample Nos. 2 to 7 having the composition in which x satisfies 0.05≤x≤0.4 are cases where x satisfies 0<x<0.5 in the ceramic composition represented by the composition formula $La(Fe_{1-x}Al_x)O_3$, and it was found based on the above-mentioned evaluations of bulk samples that these samples were chemically stable in both oxidation atmospheres and reduction atmospheres, had no ionic conductivity and a high electron conductivity (electric conductivity), and can reduce the sintering temperature to about 1300 to 1400° C. Furthermore, it was found based on the above-mentioned evaluations of bulk samples that sample Nos. 3 to 6 can provide a material which is chemically stable even in high-temperature reduction atmospheres of 1000° C., and enables a higher electron conductivity (electric conductivity).

Next, bulk samples of the ceramic compositions represented by the composition formula $Sr_{1-x}A_xTi_{1-y}B_yO_3$ in which A represents La or Y, B represents Nb or Ta, and x and y each represent a molar ratio, satisfying 0≤x≤0.5 and 0≤y≤0.5 were prepared at various composition ratios as intermediate layer materials according to the following procedure, and each sample was evaluated.

(Preparation of Bulk Sample)

In order to obtain a desired composition by setting the values of x and y, which are molar amount in the composition formula $A_{1-x}B_xTi_{1-y}C_yO_3$ in which A represents Sr, B represents La or Y, C represents Nb or Ta, and x and y each represent a molar ratio, satisfying $0 \leq x \leq 0.5$ and $0 \leq y \leq 0.5$, at predetermined values within the above-mentioned range, as starting materials of the sample, lanthanum oxide ($La_2O_3$), yttrium oxide ($Y_2O_3$), strontium carbonate ($SrCO_3$), titanium oxide ($TiO_2$), niobium oxide ($Nb_2O_5$), and tantalum oxide ($Ta_2O_5$) were weighed stoichiometrically and mixed. Water was added to the mixture, and the resulting mixture was milled with zirconia balls and mixed. Thereafter, the resulting mixed powder was dried and calcined at 1100° C. In order to form pores in the sample, carbon was added in an amount of 0 to 20% by weight to the obtained calcined powder, and an organic solvent and a butyral-based binder were added and the resulting mixture was mixed to prepare a slurry. The slurry was formed into a sheet by the doctor blade method. The resulting green sheet was subjected to a binder removal treatment, and then was sintered by being maintained at 1300° C. to obtain a sample. The following evaluations were performed with the obtained sample.

(Evaluation of Bulk Sample of Material for Intermediate Layer)

(1) X-Ray Diffraction

A produced phase was identified by performing a powder X-ray diffraction analysis (XRD, CuKα rays) after calcination and after sintering of the sample. It was identified that all of the phases produced after sintering were a single phase of a perovskite structure.

(2) Electrical Resistance

Slurries were prepared by mixing a polybutyral-based binder and a mixture of ethanol and toluene as an organic solvent with each of the material powders of the following members. The slurries were formed into green sheets of the interconnector, the intermediate layer, the fuel electrode layer and the air electrode layer by the doctor blade method.

Interconnector: A calcined powder of a starting material of ($LaFe_{0.8}Al_{0.2}O_3$) (x=0.2).

Intermediate layer: $A_{1-x}B_xTi_{1-y}C_yO_3$ in which A represents Sr, and x=0 and y=0, that is, a calcined powder of a starting material of $SrTiO_3$.

Fuel electrode layer: A compound formed by adding 30 parts by weight of a carbon powder to 100 parts by weight of a material powder made of a mixture of 65% by weight of nickel oxide (NiO) and 35% by weight of zirconia ($ZrO_2$) stabilized with yttria ($Y_2O_3$) added in an amount of 8 mol % (yttria-stabilized zirconia: 8YSZ).

Air electrode layer: A compound formed by adding 30 parts by weight of a carbon powder to 100 parts by weight of a material powder composed of $La_{0.8}Sr_{0.2}MnO_3$.

The obtained green sheets of the interconnector and the intermediate layer were processed into disc-shapes of 30 mm in diameter. The obtained green sheets of the fuel electrode layer and the air electrode layer were processed into disc-shapes of 15 mm in diameter. The green sheets of the interconnector, the intermediate layer and the fuel electrode layer were stacked sequentially on the disc-shaped green sheet of the air electrode layer. The thicknesses of the respective green sheets were set in such a way that the thicknesses of the sintered green sheets were 50 μm for the air electrode layer, 300 μm for the interconnector, 50 μm for the fuel electrode layer, and three kinds of 9 μm, 30 μm and 50 μm for the intermediate layer.

The stacked layers were press-bonded to one another at a pressure of 1000 kgf/cm² by undergoing warm isostatic pressing (WIP) at a temperature of 80° C. for 2 minutes. The press-bonded body was subjected to a binder removal treatment within the range of 400 to 500° C., and then was sintered by being maintained at 1300° C. for 3 hours.

A probe provided with a platinum net was pressed against the surfaces of the air electrode layer and the fuel electrode layer of the obtained samples of sintered laminates (sample Nos. 11 to 13), and electrical resistances of the samples were measured at 900° C. while passing air on an air electrode layer side and a humidified hydrogen gas (containing about 4% of water vapor) of 30° C. on a fuel electrode layer side. Since carbon was not added to the calcined powder as the material powder of the intermediate layer, the open porosity of the intermediate layer was 0%.

For comparison, a sample of sintered laminate (sample No. 10) was prepared by sintering a stacked layers formed by stacking an interconnector and a sheet of a fuel electrode layer sequentially on a disc-shaped green sheet of an air electrode layer, in the same manner as in the above-mentioned samples, and its electrical resistances was measured.

The measurement results of the electrical resistance are shown in Table 2.

TABLE 2

| Sample No. | 10 | 11 | 12 | 13 |
|---|---|---|---|---|
| Thickness of intermediate layer [μm] | 0 | 9 | 30 | 50 |
| Electrical resistance [Ωcm] | 168.9 | 3.0 | 3.2 | 3.4 |

It is evident from Table 2 that while the comparative example (sample No. 10), formed by stacking the air electrode layer, the interconnector and the fuel electrode layer sequentially, exhibited a high electrical resistance, the samples as examples of the present invention (sample Nos. 11 to 13), formed by stacking the air electrode layer, the interconnector, the intermediate layer and the fuel electrode layer sequentially, exhibited a considerably low electrical resistance and that the smaller the thickness of the intermediate layer, the lower the electrical resistance.

(3) Effect of Pores

In order to form pores having different porosities in the samples of the intermediate layer, carbon was added within the range of 0 to 20% by weight to a calcined powder of a starting material of $SrTiO_3$ as a material powder of the intermediate layer, and an organic solvent and a butyral-based binder were added and the resulting mixture was mixed to prepare a slurry. Then, samples of sintered laminates (sample Nos. 14 to 17) were prepared in the same manner as in the above-mentioned samples and their electrical resistances were measured. The thickness of the sintered intermediate layer was adjusted to 50 μm. The porosity was measured according to an Archimedes method.

The measurement results of the electrical resistance are shown in Table 3.

TABLE 3

| Sample No. | 14 | 15 | 16 | 17 |
|---|---|---|---|---|
| Open porosity [%] | 10 | 20 | 30 | 40 |
| Electrical resistance [Ωcm] | 3.6 | 3.7 | 3.9 | 4.1 |

It is evident from Table 3 that when the porosity is made high, the electrical resistance of the sample of sintered laminate slightly increases, but there is no problem with the level of the electrical resistance.

(4) Effect of Dopants

In order to prepare a sample of the intermediate layer composed of a material obtained by replacing a part of Sr and Ti in $SrTiO_3$, an organic solvent and a butyral-based binder were added to a calcined powder of a starting material of $Sr_{1-x}B_xTi_{1-y}C_yO_3$ (B represents La or Y, C represents Nb or Ta, x=0.2 and y=0.2) as a material powder of the intermediate layer, and the resulting mixture was mixed to prepare a slurry. Then, samples of sintered laminates (sample Nos. 18 to 21) were prepared in the same manner as in the above-mentioned samples and their electrical resistances were measured. Since carbon was not added to the calcined powder as the material powder of the intermediate layer, the open porosity of the intermediate layer was 0%. Further, the thickness of the sintered intermediate layer was adjusted to 50 μm.

The measurement results of the electrical resistance are shown in Table 4.

TABLE 4

| Sample No. | 18 | 19 | 20 | 21 |
|---|---|---|---|---|
| B | La | Y | — | — |
| C | — | — | Nb | Ta |
| Electrical resistance [Ωcm] | 2.9 | 2.9 | 2.9 | 2.9 |

It is evident from Table 4 that the electrical resistance of the sample of sintered laminate is reduced in the sample of the intermediate layer composed of a material obtained by replacing a part of Sr and Ti in $SrTiO_3$.

(Preparation and Power Generation Test of Fuel Cell Sample)

Next, a sample of a planar solid electrolyte fuel cell was prepared by using a ceramic composition having the composition (x=0.2) shown in the sample No. 5 in Table 1 as an interconnector material and a power generation test of the sample was performed.

First, material powders of members constituting the samples of solid electrolyte fuel cells 1 shown in FIGS. 6 to 8 were prepared in the following manner.

Fuel electrode layer 11: A compound formed by adding 30 parts by weight of a carbon powder to 100 parts by weight of a material powder made of a mixture of 65% by weight of nickel oxide (NiO) and 35% by weight of zirconia ($ZrO_2$) stabilized with yttria ($Y_2O_3$) added in an amount of 8 mol % (yttria-stabilized zirconia: 8YSZ).

Solid electrolyte layer 12: Zirconia ($ZrO_2$) stabilized with yttria ($Y_2O_3$) added in an amount of 10 mol % (yttria-stabilized zirconia: 10YSZ).

Air electrode layer 13: A compound formed by adding 30 parts by weight of a carbon powder to 100 parts by weight of a material powder composed of $La_{0.8}Sr_{0.2}MnO_3$.

Support structure 14: $Y_{0.15}Ta_{0.15}Zr_{0.7}O_2$ (zirconia ($ZrO_2$) stabilized with $Y_2O_3$ added in an amount of 7.5 mol % and $Ta_2O_5$ added in an amount of 7.5 mol %) (electrically insulating material).

Interconnector 15: A calcined powder of a starting material of $(LaFe_{0.8}Al_{0.2}O_3)$ (x=0.2).

Intermediate layer 18: A compound formed by adding a predetermined amount of a carbon powder to a material powder made of a calcined powder of a starting material of $SrTiO_3$ so as to give a porosity of 20%.

Figure 2:
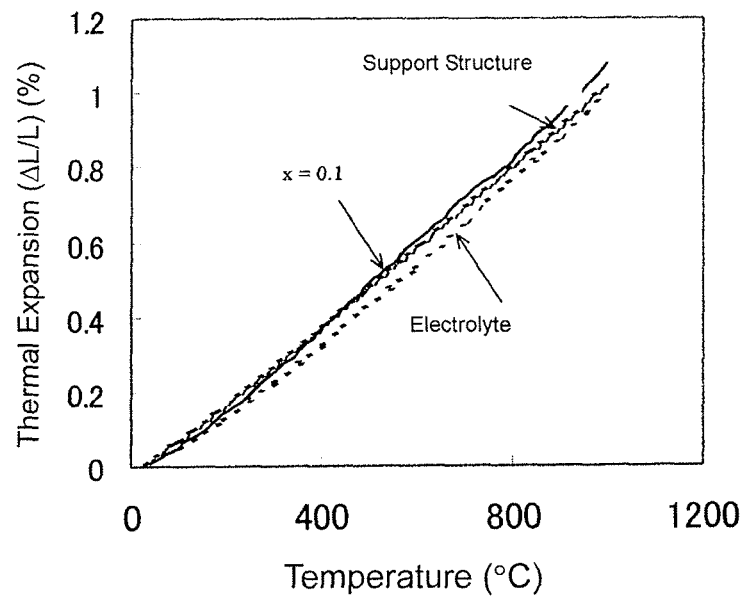
FIG. 2 is a graph showing a relationship between temperature (° C.) and thermal expansion ($\Delta L/L$) (%) in bulk samples of an interconnector, a solid electrolyte layer and a support structure.

First, the thermal expansion of the bulk samples of the interconnector 15, the solid electrolyte layer 12 and the support structure 14 was investigated by a thermomechanical analyzer (TMA). The measurement results are shown in FIG. 2, which is a graph showing the relationships between temperature (° C.) and thermal expansion (ΔL/L) (%). In the graph of FIG. 2, lines indicated by "x=0.1", "Electrolyte" and "Support Structure" show the relationships between temperature and thermal expansion in the bulk samples of the interconnector 15, the solid electrolyte layer 12 and the support structure 14. For example, the bulk samples of the interconnector 15, the solid electrolyte layer 12 and the support structure 14 had thermal expansion coefficients of $11.1 \times 10^{-6}$/K, $10.2 \times 10^{-6}$/K, and $10.5 \times 10^{-6}$/K, respectively, at 1000° C. in air. It is found that difference in the thermal expansion between the bulk samples of the interconnector 15 and the solid electrolyte layer 12 is small. It is found that difference in the thermal expansion between the bulk samples of the interconnector 15 and the support structure 14 is particularly small.

Next, material powders of the interconnector 15 and the solid electrolyte layer 12 were used and subjected to co-sintering at 1300° C. The planar dimension of the sintered body was 63 mm×49 mm, the thickness of the solid electrolyte layer 12 was 200 μm, and the thickness of the interconnector 15 was 200 μm. In the obtained sintered body, peeling between the solid electrolyte layer 12 and the interconnector 15 was not found, and the solid electrolyte layer 12 was firmly joined to the interconnector 15. The sintered body was heated to 1000° C., heating/cooling at a rate of 10° C./min were repeated, and then the sintered body was kept at 1000° C. for 24 hours, but peeling did not take place between the solid electrolyte layer 12 and the interconnector 15. Therefore, it is evident that the difference in the thermal expansion between the bulk samples of the interconnector 15 and the solid electrolyte layer 12, respectively measured as described above, presents no problem.

As shown in FIG. 6, by use of the materials thus prepared, green sheets of the fuel electrode layer 11, the solid electrolyte layer 12, the air electrode layer 13, the support structure 14, the interconnector 15, and the intermediate layer 18 were prepared in the following manner.

The material powders, a polyvinyl butyral-based binder and a mixture (weight ratio is 1:4) of ethanol and toluene as an organic solvent were mixed, and then the resulting mixtures were formed into green sheets by a doctor blade method.

As shown by dashed lines in FIG. 6, elongated through-holes 21a and 22a respectively for forming a fuel gas supply channel 21 and an air supply channel 22 shown in FIG. 7 were formed in the green sheet of the support structure 14 by puncturing the green sheet with a mechanical puncher.

Further, fitting portions 11a, 12a and 13a into which the green sheets of the fuel electrode layer 11, the solid electrolyte layer 12 and the air electrode layer 13 were to be fitted, respectively, were formed in the green sheet of the support structure 14 on which the fuel electrode layer 11, the solid electrolyte layer 12 and the air electrode layer 13 were to be arranged.

Moreover, fitting Portions 31a and 32a into which the green sheets of the current collecting layer 31 of fuel electrode and the current collecting layer 32 of air electrode were to be fitted, respectively, were formed in the green sheet of the support structure 14 on which the current collecting layer 31 of fuel electrode and the current collecting layer 32 of air electrode were to be arranged. The green sheet of the current collecting layer 31 of fuel electrode was prepared by using a material having the same composition as that of the material powder of the fuel electrode layer 11 and the green sheet of the current collecting layer 32 of air electrode was prepared by using a material having the same composition as that of the material powder of the air electrode layer 13.

Furthermore, as shown by dashed lines in FIG. 6, elongated through-holes 21a and 22a respectively for forming a fuel gas supply channel 21 and an air supply channel 22 shown in FIG. 7 were formed in the green sheets of the interconnector 15 and the intermediate layer 18 by puncturing the green sheets with a mechanical puncher.

In the green sheets of the support structures 14 thus prepared, the green sheet of the interconnector 15 was fitted into the through-hole 15a, the green sheets of the fuel electrode layer 11, the solid electrolyte layer 12 and the air electrode layer 13 were fitted into the fitting portions 11a, 12a and 13a, respectively, and the green sheets of the current collecting layer 31 of fuel electrode and the current collecting layer 32 of air electrode were fitted into the fitting portions 31a and 32a, respectively. The green sheets of the interconnector 15 and the intermediate layer 18 were stacked sequentially on three green sheets thus obtained as shown in FIG. 7. In addition, the thicknesses of the respective green sheets were set in such a way that the thicknesses of the sintered green sheets were 50 μm for the fuel electrode layer 11, 50 μm for the solid electrolyte layer 12, 50 μm for the air electrode layer 13, 300 μm for the interconnector 15, 50 μm for the intermediate layer 18, 250 μm for the current collecting layer 31 of fuel electrode, and 250 μm for the current collecting layer 32 of air electrode.

The stacked layers were press-bonded to one another at a pressure of 1000 kgf/cm² warm isostatic pressing (WIP) at a temperature of 80° C. for 2 minutes. The press-bonded body was subjected to binder removal treatment within the range of 400 to 500° C., and then was sintered by being maintained at 1300° C. for 3 hours.

The resulting sample of the solid electrolyte fuel cell 1 was heated to 900° C., and a humidified hydrogen gas (containing about 4% of water vapor) of 30° C. and air were supplied through a fuel gas supply channel 21 and an air supply channel 22, respectively, to perform a power generation test and an open circuit voltage (OCV) was measured. The open circuit voltage was 1.07 V, which was equal to a theoretical value, and cell impedance was small. Both the open circuit voltage and the impedance did not change even after applying a current at a current density of 0.4 A/cm². It is evident from this result that the solid electrolyte fuel cell 1 including the interconnector 15 can form a dense body without producing cracks by co-sintering, and particularly, did not form a high-resistive layer not only between the interconnector 15 and the air electrode layer 13, but also between the interconnector 15 and the fuel electrode layer 11 and provided good electrical connection.

Embodiments and examples disclosed herein are to be construed to be illustrative in all respects and but not restrictive. The scope of the present invention is defined by the appended claims rather than by the preceding embodiments and examples, and all modifications and variations equivalent to bounds of the claims and within bounds of the claims are intended to be embraced by the present invention.

INDUSTRIAL APPLICABILITY

Since it is possible to obtain an interconnector material which is chemically stable in both oxidation atmospheres and reduction atmospheres, has a low ionic conductivity and a high electron conductivity (electric conductivity), and can be densified at a low temperature of about 1300 to 1400° C., by using the interconnector material, it is possible to obtain an intercellular separation structure, which is chemically stable in a high-temperature environment of 800 to 1000° C., the operating temperature of a solid electrolyte fuel cell, and in both oxidation atmospheres and reduction atmospheres, and a solid electrolyte fuel cell including the intercellular separation structure.

DESCRIPTION OF REFERENCE SYMBOLS

1: solid electrolyte fuel cell, 11: fuel electrode layer, 12: solid electrolyte layer, 13: air electrode layer, 14: support structure, 15: interconnector, 18: intermediate layer, 21: fuel gas supply channel, and 22: air supply channel.

The invention claimed is:

1. A cell structure comprising:
   a plurality of cells which each comprise
   an anode layer,
   a solid electrolyte layer,
   a cathode layer stacked sequentially; and
   an intercellular separation structure disposed between cells of the plurality of cells,
   the intercellular separation structure comprising an electrical insulator disposed to separate an anode gas and a cathode gas which are supplied to each of the plurality of cells and an electrical conductor in the electrical insulator electrically connecting the plurality of cells to each other, and
   the electrical conductor comprising a first conductive body electrically connected to the anode layer, a second conductive body electrically connected to the cathode layer, and an interconnector of dense material through which a gas does not a pass disposed to connect the first conductive body and second conductive body.

2. The solid electrolytic fuel cell structure according to claim 1 wherein
   the anode layer comprises a fuel electrode and the cathode layer comprises an air electrode,
   the first conductive body contacts the anode layer through the fuel electrode, and
   the second conductive body contacts the cathode layer through the air electrode.

3. The solid electrolyte fuel cell according to claim 2, wherein the anode layer comprises nickel.

4. The solid electrolytic fuel cell structure according to claim 3 wherein the interconnector comprises a ceramic component electrical conductor having a compositional formula of $La(Fe_{1-x}Al_x)O_3$ in which $0<x<0.5$.

5. The solid electrolytic fuel cell structure according to claim 2 wherein the interconnector comprises a ceramic component electrical conductor having a compositional formula of $La(Fe_{1-x}Al_x)O_3$ in which $0<x<0.5$.

6. The solid electrolytic fuel cell structure according to claim 5, wherein $0.1 \leq x \leq 0.3$.

7. The solid electrolytic fuel cell structure according to claim 1 wherein the interconnector comprises a ceramic component electrical conductor having a compositional formula of $La(Fe_{1-x}Al_x)O_3$ in which $0<x<0.5$.

8. The solid electrolytic fuel cell structure according to claim 5, wherein $0.1 \leq x \leq 0.3$.

9. The solid electrolyte fuel cell according to claim 8, wherein the anode layer comprises nickel.

10. The solid electrolyte fuel cell according to claim 1, wherein the anode layer comprises nickel.

11. The solid electrolyte fuel cell according to claim 1, further comprising:
- a first current collecting layer disposed between the anode layer and the first conductive body; and
- a second current collecting layer disposed between the cathode layer and the second conductive body.

\* \* \* \* \*